(12) United States Patent
Oka et al.

(10) Patent No.: US 12,391,239 B2
(45) Date of Patent: *Aug. 19, 2025

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventors: Keisuke Oka, Wako (JP); Masayuki Nakatsuka, Wako (JP); Shinya Maruo, Wako (JP); Shunya Ishikawa, Wako (JP); Yohei Kitahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 205 days.

This patent is subject to a terminal disclaimer.

(21) Appl. No.: 18/113,101

(22) Filed: Feb. 23, 2023

(65) Prior Publication Data
US 2023/0294676 A1 Sep. 21, 2023

(30) Foreign Application Priority Data
Mar. 18, 2022 (JP) ................. 2022-043718

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01); *B60W 50/14* (2013.01);
(Continued)

(58) Field of Classification Search
CPC ...... B60W 30/09; B60W 10/18; B60W 10/20; B60W 50/14; B60W 2554/4041;
(Continued)

(56) References Cited

U.S. PATENT DOCUMENTS

| 6,397,140 B2 | 5/2002 | Minowa et al. |
| 10,457,277 B2 | 10/2019 | Bonarens et al. |

(Continued)

FOREIGN PATENT DOCUMENTS

| JP | 2007-210591 | 8/2007 |
| JP | 2013-126823 | 6/2013 |

(Continued)

OTHER PUBLICATIONS

Japanese Office Action for Japanese Patent Application No. 2022-043718 mailed Jan. 9, 2024.

(Continued)

*Primary Examiner* — James J Lee
*Assistant Examiner* — Andrew Sang Kim
(74) *Attorney, Agent, or Firm* — Amin, Turocy & Watson, LLP

(57) ABSTRACT

At least one processor executes a first preliminary operation control process of notifying that an object is present when an indicator value is less than a second threshold and there is a travel path along which the vehicle is able to travel on one of left and right sides of the object and executes a second preliminary operation control process of notifying a driver when the indicator value is less than a third threshold and there is no travel path on both left and right sides of the object. The second preliminary operation or the first preliminary operation is executed when the indicator value is less than the third threshold, there is a travel path along which the vehicle is able to travel, and it is estimated that there is an interfering object in the travel path on the assumption that the vehicle has approached the object.

9 Claims, 11 Drawing Sheets

(51) Int. Cl.
  *B60W 10/20* (2006.01)
  *B60W 50/14* (2020.01)
(52) U.S. Cl.
  CPC ............... *B60W 2554/4041* (2020.02); *B60W 2554/804* (2020.02); *B60W 2710/18* (2013.01); *B60W 2710/20* (2013.01)
(58) Field of Classification Search
  CPC ....... B60W 2554/804; B60W 2710/18; B60W 2710/20; B60W 30/08; B60W 2554/40; B60W 2554/80
  See application file for complete search history.

(56) References Cited

U.S. PATENT DOCUMENTS

| | | | |
|---|---|---|---|
| 2014/0136044 A1* | 5/2014 | Conrad | G01S 13/931 701/23 |
| 2014/0195120 A1* | 7/2014 | McClain | G08G 1/16 701/1 |
| 2015/0232090 A1* | 8/2015 | Jeon | B60W 50/14 701/1 |
| 2016/0332569 A1* | 11/2016 | Ishida | B60Q 9/008 |
| 2019/0061745 A1 | 2/2019 | Hatano | |
| 2019/0126917 A1 | 5/2019 | You | |
| 2020/0269867 A1* | 8/2020 | Hua | B60T 7/22 |
| 2020/0282983 A1 | 9/2020 | Ito et al. | |
| 2021/0300342 A1 | 9/2021 | Hara et al. | |
| 2022/0122460 A1* | 4/2022 | Takaki | B60Q 1/535 |

FOREIGN PATENT DOCUMENTS

| | | |
|---|---|---|
| JP | 2017-208898 | 11/2017 |
| JP | 2020-050010 | 4/2020 |
| JP | 2020-097346 | 6/2020 |
| WO | 2017/154070 | 9/2017 |
| WO | 2019/102772 | 5/2019 |

OTHER PUBLICATIONS

Japanese Office Action for Japanese Patent Application No. 2022-043717 mailed Jan. 9, 2024.
Non-Final Office Action for U.S. Appl. No. 18/113,648 mailed Dec. 18, 2024.
U.S. Notice of Allowance for U.S. Appl. No. 18/113,648 mailed May 23, 2025.

* cited by examiner

DRIVING ASSISTANCE DEVICE, DRIVING ASSISTANCE METHOD, AND STORAGE MEDIUM

CROSS-REFERENCE TO RELATED APPLICATION

Priority is claimed on Japanese Patent Application No. 2022-043718, filed Mar. 18, 2022, the content of which is incorporated herein by reference.

BACKGROUND

Field of the Invention

The present invention relates to a driving assistance device, a driving assistance method, and a storage medium.

Description of Related Art

Recently, an invention of a vehicle control device for performing automated deceleration control and automated steering control has been disclosed (Japanese Unexamined Patent Application, First Publication No. 2020-50010).

SUMMARY

In a vehicle capable of performing automated steering control in addition to automated deceleration control, a probability that any sudden change in a surrounding environment of a vehicle can be coped with quickly becomes high and a degree of control margin becomes relatively high. On the other hand, because automated steering control becomes difficult if there is no avoidance space on a lateral side of a target object, a degree of control margin is no different from that of a vehicle that performs only automated deceleration control. In the conventional technology, it may be difficult to perform an operation corresponding to the above-described environment difference.

The present invention has been made in consideration of such circumstances and an objective of the present invention is to provide a driving assistance device, a driving assistance method, and a storage medium capable of performing an appropriate operation corresponding to a surrounding situation of a target object.

A driving assistance device, a driving assistance method, and a storage medium adopt the following configurations.

(1): According to an aspect of the present invention, there is provided a driving assistance device including: a storage medium storing computer-readable instructions; and at least one processor connected to the storage medium, the at least one processor executing the computer-readable instructions to: execute referring process of referring to an output of a detection device for detecting that an object is located in front of a vehicle; execute one or both of a braking control process of instructing a brake device of the vehicle to stop the vehicle when an indicator value that decreases as the vehicle approaches the object is less than a first threshold, and a steering-based avoidance control process of instructing a steering device of the vehicle to avoid a collision with the object in steering; execute a first preliminary operation control process of performing a first preliminary operation of notifying a driver of the vehicle that the object is present when the indicator value is less than a second threshold and it is determined, at or near a time point when the indicator value is less than the second threshold, that there is a travel path along which the vehicle is able to travel on one of left and right sides of the object after the vehicle avoids the collision with the object in the steering; and execute a second preliminary operation control process of performing a second preliminary operation of notifying the driver of the vehicle that the object is present when the indicator value is less than a third threshold and it is determined, at a time point when the indicator value is less than the third threshold, that there is no travel path along which the vehicle is able to travel on both left and right sides of the object after the vehicle avoids the collision with the object in the steering, wherein the first threshold is less than the second threshold and the second threshold is less than the third threshold, and wherein the second preliminary operation or the first preliminary operation is executed when it is determined, at or near the time point when the indicator value is less than the third threshold, that there is a travel path along which the vehicle is able to travel and it is estimated that there is an interfering object that interferes with the travel path along which the vehicle is able to travel on the assumption that the vehicle has approached the object.

(2): In the above-described aspect (1), the at least one processor performs the first preliminary operation at the time point when the indicator value is less than the second threshold when the indicator value is less than the second threshold, it is determined, at or near the time point when the indicator value is less than the second threshold, that there is a travel path along which the vehicle is able to travel, and it is estimated that there is no interfering object.

(3): In the above-described aspect (1) or (2), the interfering object is an object estimated to be located in an available travel space on the assumption that the vehicle has approached the available travel space.

(4): In any one of the above-described aspects (1) to (3), the interfering object is another vehicle located behind the vehicle and traveling at a higher speed than the vehicle in a lane corresponding to the available travel space.

(5): In any one of the above-described aspects (1) to (4), the at least one processor performs the second preliminary operation when the indicator value is less than the third threshold, the indicator value is not less than the second threshold, it is determined that there is a travel path along which the vehicle is able to travel, and it is estimated that the interfering object is located.

(6): In any one of the above-described aspects (1) to (4), the at least one processor performs the first preliminary operation when the indicator value is less than the third threshold, the indicator value is not less than the second threshold, it is determined that there is a travel path along which the vehicle is able to travel, and it is estimated that the interfering object is located.

(7): In any one of the above-described aspects (1) to (4), the at least one processor performs the first preliminary operation when the indicator value is less than the second threshold, it is determined, at or near the time point when the indicator value is less than the second threshold, that there is a travel path along which the vehicle is able to travel, and it is estimated that the interfering object is not located, and, when the indicator value is less than the second threshold, it is determined, at a time point when the indicator value is not less than a first threshold, that there is a travel path along which the vehicle is able to travel, and it is estimated that the interfering object is not present, the at least one processor makes the transition to the first preliminary operation having a higher operation level than the first preliminary operation that is performed when it is estimated that the interfering object is not located.

(8): According to an aspect of the present invention, there is provided a driving assistance method including: executing, by a driving assistance device, referring process of referring to an output of a detection device for detecting that an object is located in front of a vehicle; one or both of a braking control process of instructing a brake device of the vehicle to stop the vehicle when an indicator value that decreases as the vehicle approaches the object is less than a first threshold, and a steering-based avoidance control process of instructing a steering device of the vehicle to avoid a collision with the object in steering; executing, by the driving assistance device, a first preliminary operation control process of performing a first preliminary operation of notifying a driver of the vehicle that the object is present when the indicator value is less than a second threshold and it is determined, at or near a time point when the indicator value is less than the second threshold, that there is a travel path along which the vehicle is able to travel on one of left and right sides of the object after the vehicle avoids the collision with the object in the steering; and executing, by the driving assistance device, a second preliminary operation control process of performing a second preliminary operation of notifying the driver of the vehicle that the object is present when the indicator value is less than a third threshold and it is determined, at a time point when the indicator value is less than the third threshold, that there is no travel path along which the vehicle is able to travel on both left and right sides of the object after the vehicle avoids the collision with the object in the steering, wherein the first threshold is less than the second threshold and the second threshold is less than the third threshold, and wherein the second preliminary operation or the first preliminary operation is executed when it is determined, at or near the time point when the indicator value is less than the third threshold, that there is a travel path along which the vehicle is able to travel and it is estimated that there is an interfering object that interferes with the travel path along which the vehicle is able to travel on the assumption that the vehicle has approached the object.

(9): According to an aspect of the present invention, there is provided a non-transitory computer storage medium storing a program for causing a computer to: execute referring process of referring to an output of a detection device for detecting that an object is located in front of a vehicle; execute one or both of a braking control process of instructing a brake device of the vehicle to stop the vehicle when an indicator value that decreases as the vehicle approaches the object is less than a first threshold, and a steering-based avoidance control process of instructing a steering device of the vehicle to avoid a collision with the object in steering; execute a first preliminary operation control process of performing a first preliminary operation of notifying a driver of the vehicle that the object is present when the indicator value is less than a second threshold and it is determined, at or near a time point when the indicator value is less than the second threshold, that there is a travel path along which the vehicle is able to travel on one of left and right sides of the object after the vehicle avoids the collision with the object in the steering; and execute a second preliminary operation control process of performing a second preliminary operation of notifying the driver of the vehicle that the object is present when the indicator value is less than a third threshold and it is determined, at a time point when the indicator value is less than the third threshold, that there is no travel path along which the vehicle is able to travel on both left and right sides of the object after the vehicle avoids the collision with the object in the steering, wherein the first threshold is less than the second threshold and the second threshold is less than the third threshold, and wherein the second preliminary operation or the first preliminary operation is executed when it is determined, at or near the time point when the indicator value is less than the third threshold, that there is a travel path along which the vehicle is able to travel and it is estimated that there is an interfering object that interferes with the travel path along which the vehicle is able to travel on the assumption that the vehicle has approached the object.

According to the above-described aspects, it is possible to perform an appropriate operation corresponding to a surrounding situation of a target object.

DESCRIPTION OF EMBODIMENTS

Hereinafter, embodiments of a driving assistance device, a driving assistance method, and a storage medium according to the present invention will be described with reference to the drawings. As used throughout this disclosure, the singular forms "a," "an," and "the" include plural reference unless the context clearly dictates otherwise.

[Overall Configuration]

Figure 1:
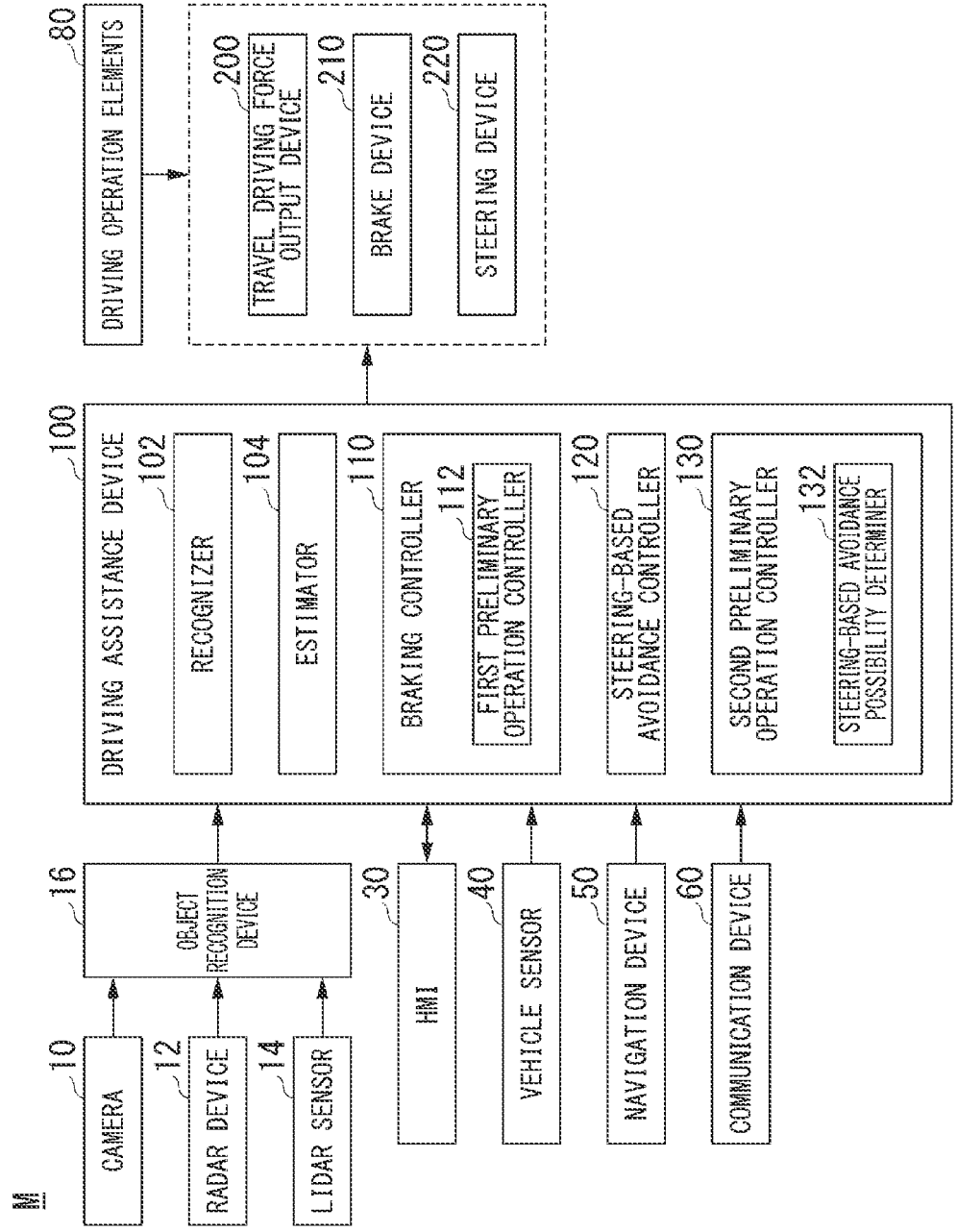
FIG. 1 is a configuration diagram of a vehicle in which a driving assistance device according to an embodiment is mounted.

FIG. 1 is a configuration diagram of a vehicle M in which a driving assistance device 100 of an embodiment is mounted. The vehicle M is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a secondary battery or a fuel cell is discharged.

For example, the vehicle M includes a camera 10, a radar device 12, a light detection and ranging (LIDAR) sensor 14, an object recognition device 16, a human machine interface (HMI) 30, a vehicle sensor 40, a navigation device 50, a communication device 60, driving operation elements 80, a driving assistance device 100, a travel driving force output device 200, a brake device 210, and a steering device 220. Such devices and equipment are connected to each other by a multiplex communication line such as a controller area network (CAN) communication line, a serial communication line, or a wireless communication network. Also, the configuration shown in FIG. 1 is merely an example and some of the components may be omitted or other components may be further added.

For example, the camera 10 is a digital camera using a solid-state imaging element such as a charge-coupled device (CCD) or a complementary metal oxide semiconductor (CMOS). The camera 10 is attached to any location on the vehicle (hereinafter, the vehicle M) in which the vehicle system 1 is mounted. When the view in front of the vehicle M is imaged, the camera 10 is attached to an upper part of a front windshield, a rear surface of a rearview mirror, or the like. When the view to the rear is imaged, the camera 10 is attached at any position such as a sideview mirror, a rear bumper, or a rear windshield. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of an object by detecting radio waves (reflected waves) reflected by the object. The radar device 12 is attached to any location on the vehicle M. The radar device 12 may detect a position and speed of the object in a frequency modulated continuous wave (FM-CW) scheme.

The LIDAR sensor 14 radiates light (or electromagnetic waves of a wavelength close to an optical wavelength) to the vicinity of the vehicle M and measures scattered light. The LIDAR sensor 14 detects a distance to an object on the basis of a time period from light emission to light reception. The radiated light is, for example, pulsed laser light. The LIDAR sensor 14 is attached to any location on the vehicle M. The radar device 12 or the LIDAR sensor 14 is attached to a front portion or a rear portion of the vehicle M, for example, so that a situation in front of and behind the vehicle M is detected.

The object recognition device 16 performs a sensor fusion process for detection results from some or all of the camera 10, the radar device 12, and the LIDAR sensor 14 to recognize a position, a type, a speed, and the like of an object. The object recognition device 16 outputs recognition results to the driving assistance device 100. The object recognition device 16 may output detection results of the camera 10, the radar device 12, and the LIDAR sensor 14 to the driving assistance device 100 as they are. The object recognition device 16 may be omitted from the vehicle system 1. Some or all of the camera 10, the radar device 12, the LIDAR sensor 14, and the object recognition device 16 are an example of a "detection device."

The HMI 30 provides an occupant of the vehicle M with various types of information and receives an input operation from the occupant. The HMI 30 includes various types of display devices, a speaker, a buzzer, a vibration generation device (a vibrator), a touch panel, a switch, a key, and the like.

The vehicle sensor 40 includes a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, and the like.

The navigation device 50 has, for example, a global navigation satellite system (GNSS) receiver, a guidance controller, a storage storing map information, and the like. The GNSS receiver identifies a position of the vehicle M on the basis of signals received from GNSS satellites. A position of the vehicle M may be identified or corrected by an inertial navigation system (INS) using an output of the vehicle sensor 40. For example, the guidance controller decides on a route from the position of the vehicle M identified by the GNSS receiver (or any input position) to a destination input by the occupant with reference to the map information and causes the HMI 30 to output guidance information so that the vehicle M travels along a path. The map information is, for example, information in which a road shape is expressed by a link indicating a road and nodes connected by the link. The map information may include curvature of a road, point of interest (POI) information, and the like. The navigation device 50 may transmit a current position and a destination of the vehicle M to a navigation server via the communication device and acquire a route from the navigation server.

The communication device 60 is a communication interface that communicates with other vehicles. The communication device 60 acquires situations such as positions, speeds, and acceleration of other vehicles from the other vehicles.

The driving operation element 80 includes, for example, an accelerator pedal, a brake pedal, a steering wheel, a shift lever, and other operation elements. A sensor for detecting an operation amount or the presence or absence of an operation is attached to the driving operation element 80 and a detection result thereof is output to some or all of the travel driving force output device 200, the brake device 210, and the steering device 220.

The travel driving force output device 200 outputs a travel driving force (torque) for enabling the vehicle to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the driving assistance device 100 or information input from the driving operation element 80.

For example, the brake device 210 includes a brake caliper, a cylinder configured to transfer hydraulic pressure to the brake caliper, an electric motor configured to generate hydraulic pressure in the cylinder, and an ECU. The ECU controls the electric motor in accordance with the information input from the driving assistance device 100 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. Also, the brake device 210 is not limited to the above-described configuration and may be an electronically controlled hydraulic brake device configured to control an actuator in accordance with information input from the driving assistance device 100 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the driving assistance device 100 or the information input from the driving operation element 80 to change the direction of the steerable wheels.

[Driving Assistance Device]

The driving assistance device 100 includes, for example, a recognizer 102, an estimator 104, a braking controller 110, a steering-based avoidance controller 120, and a second preliminary operation controller 130. The braking controller 110 includes a first preliminary operation controller 112 and the second preliminary operation controller 130 includes a steering-based avoidance possibility determiner 132. Each of these functional components is implemented, for example, by a hardware processor such as a central processing unit (CPU) executing a program (software). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as a hard disk drive (HDD) or a flash memory of the driving assistance device 100 or may be stored in a removable storage medium such as a digital video disc (DVD) or a compact disc (CD)-read-only memory (ROM) and installed in the HDD or the flash memory of the driving assistance device 100 when the storage medium (the non-transitory storage medium) is mounted in a drive device. Functional components of some or all of the braking controller 110, the steering-based avoidance controller 120, and the second preliminary operation controller 130 may be integrated.

Setting is performed inside of the travel driving force output device 200, the brake device 210, and the steering device 220 so that instructions from the driving assistance device 100 to the travel driving force output device 200, the brake device 210, and the steering device 220 are issued with preference over a detection result from the driving operation element 80. Also, in relation to braking, if a braking force based on an operation amount of the brake pedal is larger than that in the instruction from the driving assistance device 100, setting may be performed so that the braking operation is preferentially executed. Also, as a mechanism for preferentially issuing an instruction from the driving assistance device 100, the communication priority in the in-vehicle LAN may be used.

Figure 2:
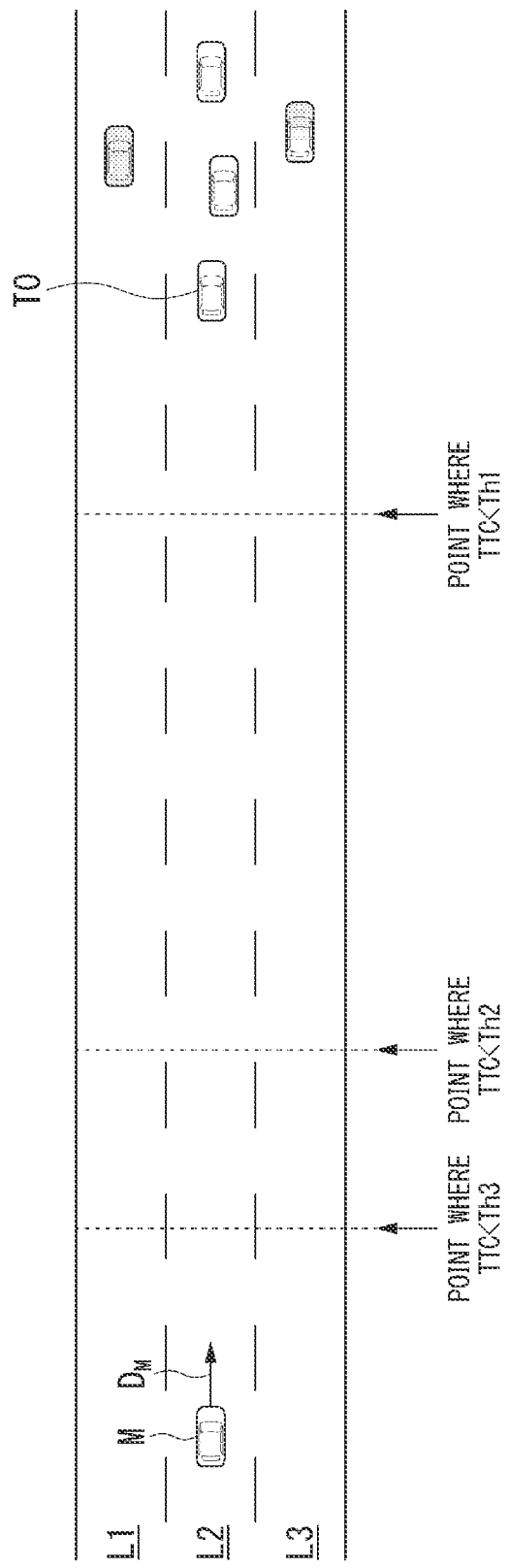
FIG. 2 is a diagram showing an overview of a function of the driving assistance device.

FIG. 2 is a diagram showing an overview of a function of the driving assistance device 100. Hereinafter, each part of the driving assistance device 100 will be described with reference to FIG. 2 and FIG. 1. In FIG. 2, the vehicle M is traveling on a three-lane road and is in a lane L2 in the center thereof. DM denotes a traveling direction of the vehicle M.

The recognizer 102 recognizes an object with reference to an output of the detection device (described above) for detecting that an object is located in front of or behind the vehicle M. The recognizer 102 recognizes the position, the speed, the acceleration, and the like of the object in front of or behind the vehicle M with reference to the output of the detection device.

The estimator 104 estimates the future behavior of the object on the basis of a recognition result of the recognizer 102. The estimator 104 estimates the position of the object after a prescribed time on the basis of an estimation result. For example, the estimator 104 estimates the behavior of another vehicle that is the object on the basis of the acceleration of the other vehicle and the situation in front of the other vehicle. For example, the estimator 104 estimates the behavior of the other vehicle by applying the acceleration and speed of the other vehicle to a profile provided in advance. Also, the estimator 104 may estimate the behavior of the other vehicle using information (position, speed, acceleration, and the like) acquired by the communication device 60 in place of (or in addition to) the recognition result of the recognizer 102.

The braking controller 110 instructs the brake device 210 and/or the travel driving force output device 200 to decelerate and stop the vehicle M when a degree of proximity between a target object TO among objects and the vehicle M satisfies a first condition with reference to an output of the detection device (described above) that detects that an object is located in front of the vehicle M. The target object TO is an object located on the same travel path as the vehicle M and on the traveling direction side of the vehicle M and is an object with which the vehicle M should avoid a collision, rather than objects that the vehicle M can pass over such as manholes. The braking controller 110 extracts such an object and sets the extracted object as the target object TO. In the example of FIG. 2, another vehicle at the rear end of the conventional example is set as the target object TO. The travel path is, for example, a lane, but may be a virtual lane virtually set by the vehicle M on a road surface on which there is no road marking. The same is also true for the following description.

The "degree of proximity" is represented by various types of indicator values that indicate the degree of proximity between objects. For example, the "degree of proximity" is time to collision (TTC), which is an indicator value obtained by dividing a distance by a relative speed (positive in a direction in which objects approach each other). Also, when the relative speed is negative (in a direction in which objects move away from each other), the TTC is provisionally set to infinity. The TTC is an indicator value indicating that the "degree of proximity" increases as the value decreases. The fact that the "first condition" is satisfied indicates, for example, that the TTC is less than a first threshold Th1. The first threshold Th1 is, for example, a value of about 1.1 to 1.9 [sec]. Instead of the TTC, an indicator value having a similar property thereto, for example, a headway time, a distance, or another indicator value, may be used as the "degree of proximity" Also, the TTC adjusted in consideration of acceleration and jerk may be used as the "degree of proximity" In the following description, it is assumed that the "degree of proximity" is the TTC.

When the TTC is less than the first threshold Th1, for example, the braking controller 110 instructs the brake device 210 and/or the travel driving force output device 200 to output a braking force for decelerating the vehicle M at first deceleration B1. The first deceleration B1 is, for example, a deceleration of about 0.1 to 0.9 [G] (close to 1). Thereby, the braking controller 110 causes the vehicle M to quickly decelerate and stop and avoids a collision with the target object TO. The ECU of the brake device 210 or the travel driving force output device 200 has a function of obtaining a brake output, a regeneration control amount, an engine brake amount, or the like from instruction-specific deceleration. The ECU decides on each control amount on the basis of the instruction-specific deceleration and the speed of the vehicle M. This is well-known technology and detailed description thereof will be omitted.

The operation of the first preliminary operation controller 112 will be described below and the steering-based avoidance controller 120 will be described first.

Figure 3:
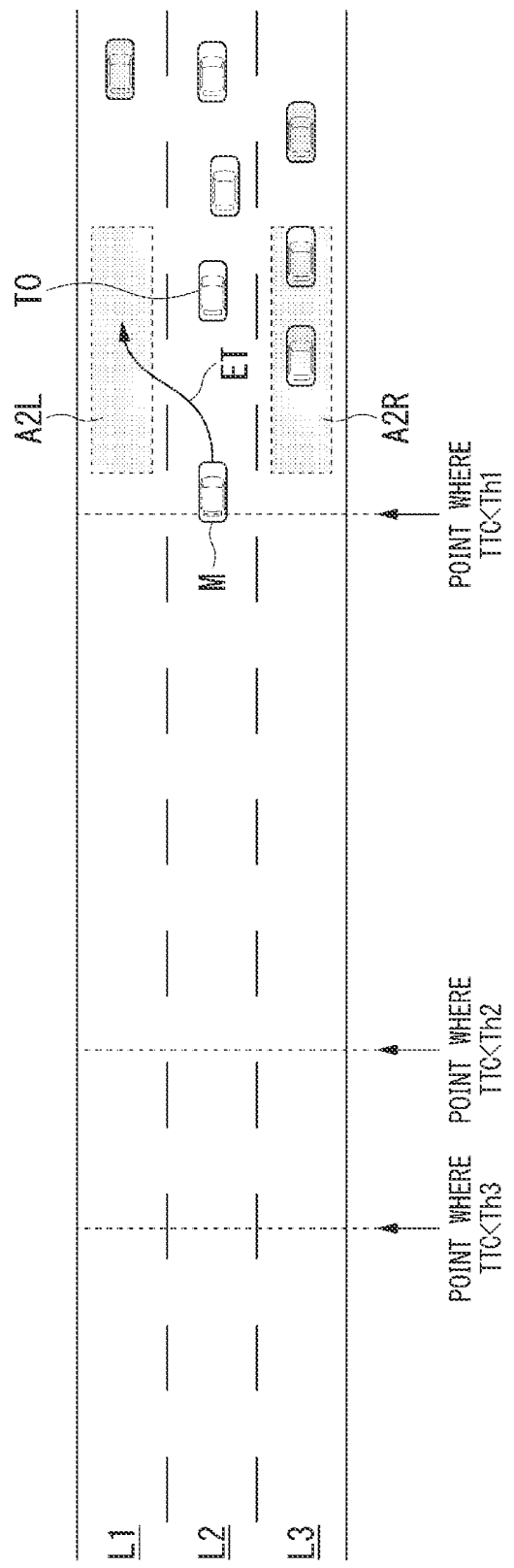
FIG. 3 is a diagram showing an example of an operation scene of a steering-based avoidance controller.

FIG. 3 is a diagram showing an example of an operation scene of the steering-based avoidance controller 120. The steering-based avoidance controller 120 determines whether or not there is a space where the vehicle M is able to travel in a travel path (for example, a lane L1 or L2) on a lateral side of the target object TO when it is determined that it is difficult for the braking controller 110 to stop the vehicle M in front of the target object TO, generates an avoidance trajectory ET when it is determined that there is a space, and issues an instruction to the steering device 220 so that the vehicle M travels along the avoidance trajectory ET (steering-based avoidance). For example, the steering-based avoidance controller 120 determines whether or not an object is located in lateral side areas extending slightly in front of and behind the target vehicle on both lateral sides of the target vehicle TO, such as areas A2L and A2R shown in FIG. 3, and determines that there is a space where the vehicle M is able to travel in a travel path on a lateral side of the target object TO when there is no object. The determination of whether or not it is difficult for the braking controller 110 to stop the vehicle M in front of the target object TO may be made by the braking controller 110, or may be made by the steering-based avoidance controller 120. The steering-based avoidance controller 120 may also recognize a boundary of a travel path by, for example, recognizing a white line or a road shoulder of a camera image, and determine that an object is located in an area when neither of the available travel areas A2L and A2R is present, for example, when neither of the lanes L1 and L3 is present.

Steering-based avoidance is performed in a situation in which a sudden change in the surrounding environment of the vehicle has occurred such as a situation in which a target object TO decelerates unexpectedly or an object different from a recognized target object TO intervenes between the vehicle M and the target object TO and is set as a new target vehicle TO. In this situation, there is a possibility that a countermeasure cannot be taken at deceleration calculated in advance so that the vehicle stops in front of the target vehicle TO, but it is possible to increase a probability that sudden changes in the surrounding environment of the vehicle can be coped with by providing a steering-based avoidance function.

[Preliminary Operation]

Figure 4:
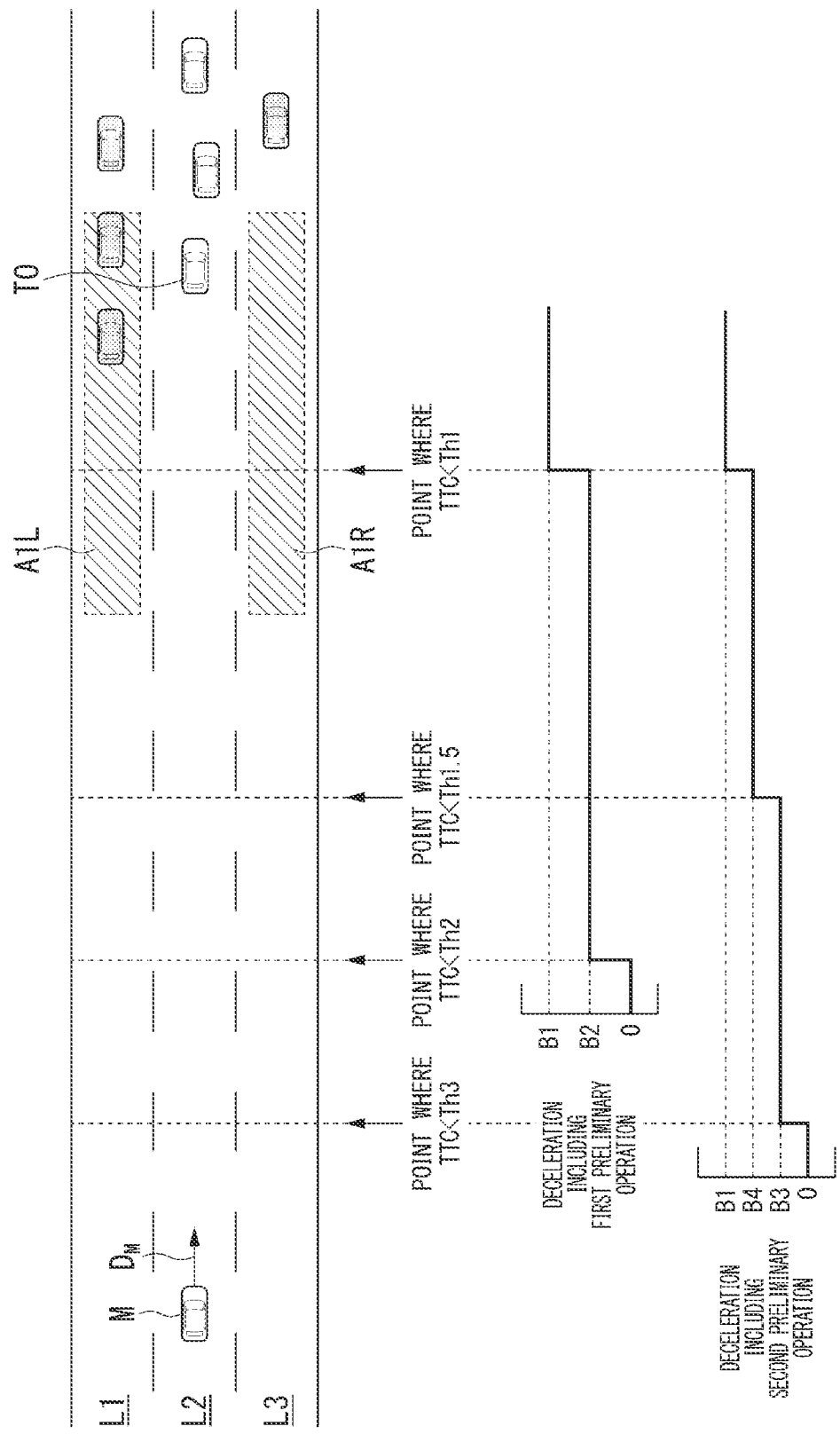
FIG. 4 is a diagram for describing a preliminary operation.

The processes of the first preliminary operation controller 112 and the second preliminary operation controller 130 will be described below. FIG. 4 is a diagram for describing a preliminary operation.

When a degree of proximity between a target object TO and the vehicle M satisfies a second condition (for example, when the TTC is less than a second threshold Th2), the first preliminary operation controller 112 performs a first preliminary operation for notifying a driver of the vehicle M of the presence of the target object TO. The first preliminary operation is, for example, an operation of instructing the brake device 210 and/or the travel driving force output device 200 to output a braking force for decelerating the vehicle M at second deceleration B2 from the time when the TTC is less than the second threshold Th2 to the time when the TTC is less than the first threshold Th1. The second deceleration B2 is deceleration less than the first deceleration B1 (or close to zero). The second threshold Th2 is a value larger than the first threshold Th1. Accordingly, the first condition is a condition that is satisfied when the degree of proximity is higher than that of the second condition.

When it is determined that the degree of proximity between the target object TO and the vehicle M satisfies a third condition (for example, the TTC is less than a third threshold Th3) and there is no available travel space in both travel paths on lateral sides of the target object TO after the vehicle M avoids a collision with the target object TO in steering at the time point when the third condition is satisfied, the second preliminary operation controller 130 performs a second preliminary operation of notifying the driver of the vehicle M of the presence of the target object TO. A determination related to the available travel space is made by the steering-based avoidance possibility determiner 132. The third threshold Th3 is a value larger than the second threshold Th2. Accordingly, the second condition is a condition that is satisfied when the degree of proximity is higher than that of the third condition.

For example, the steering-based avoidance possibility determiner 132 determines whether or not an object is located within lateral side areas extending slightly in front of and behind the target vehicle on both lateral sides of the target vehicle TO, such as areas A1L and A1R shown in FIG. 4, for example, at a time point when the TTC is less than the third threshold Th3, and determines that there is a space where the vehicle M is able to travel in a travel path on the lateral side of the target object TO when there is no object. The areas A1L and MR is set to be larger than the areas A2L and A2R, respectively, for example, in consideration of future uncertain factors. Like the steering-based avoidance controller 120, the steering-based avoidance possibility determiner 132 may also recognize the boundary of the travel path by recognizing a white line and a road shoulder in a camera image and determine that an object is located in the area when neither of the available travel areas A1L and MR is present, for example, when neither of the lanes L1 and L3 is present. In the example of FIG. 4, because there is no object in the area MR, the steering-based avoidance possibility determiner 132 determines that there is a space where the vehicle M is able to travel in a travel path on the lateral side of the target object TO.

The second preliminary operation is, for example, an operation of instructing the brake device 210 and/or the travel driving force output device 200 to output a braking force for decelerating the vehicle M at third deceleration B3 from the time when the TTC is less than the third threshold Th3 to the time when the TTC is less than the first threshold Th1 and subsequently instructing the brake device 210 and/or the travel driving force output device 200 to output a braking force for decelerating the vehicle M at fourth deceleration B4. The third deceleration B3 is, for example, deceleration less than the second deceleration B2 (or close to zero), and the fourth deceleration B4 is deceleration greater than or substantially equal to the second deceleration and less than the first deceleration B1. A timing when the deceleration is switched from the third deceleration B3 to the fourth deceleration B4 may be set arbitrarily. For example, when a degree of proximity between the target object TO and the vehicle M satisfies a 1.5th condition (for example, when the TTC is less than a threshold Th1.5), the deceleration is switched from the third deceleration B3 to the fourth deceleration B4. The 1.5th condition is a condition that is satisfied when a degree of proximity is higher than that of the second condition. When the second condition is satisfied, the deceleration may be switched from the third deceleration B3 to the fourth deceleration B4.

Thus, a start timing of the second preliminary operation is earlier than that of the first preliminary operation and the second preliminary operation is performed in multiple steps. As described above, in a situation in which steering-based avoidance is possible, a probability that any sudden change in the surrounding environment of the vehicle can be coped with quickly becomes high and a degree of control margin becomes relatively high. On the other hand, because it is difficult to execute a steering-based avoidance function even if the steering-based avoidance function is provided when there is no avoidance space on the lateral side of the target object, a degree of control margin is no different from that of a vehicle that performs only an automated stop operation. That is, it is preferable to warn the driver of the vehicle M more quickly and effectively in a situation in which steering-based avoidance is difficult than in a situation in which steering-based avoidance is possible. According to the present embodiment, a start timing of the second preliminary operation is earlier than that of the first preliminary operation and the second preliminary operation is performed in multiple steps, and therefore it is possible to perform an appropriate preliminary operation corresponding to the surrounding situation of the target object.

Figure 5:
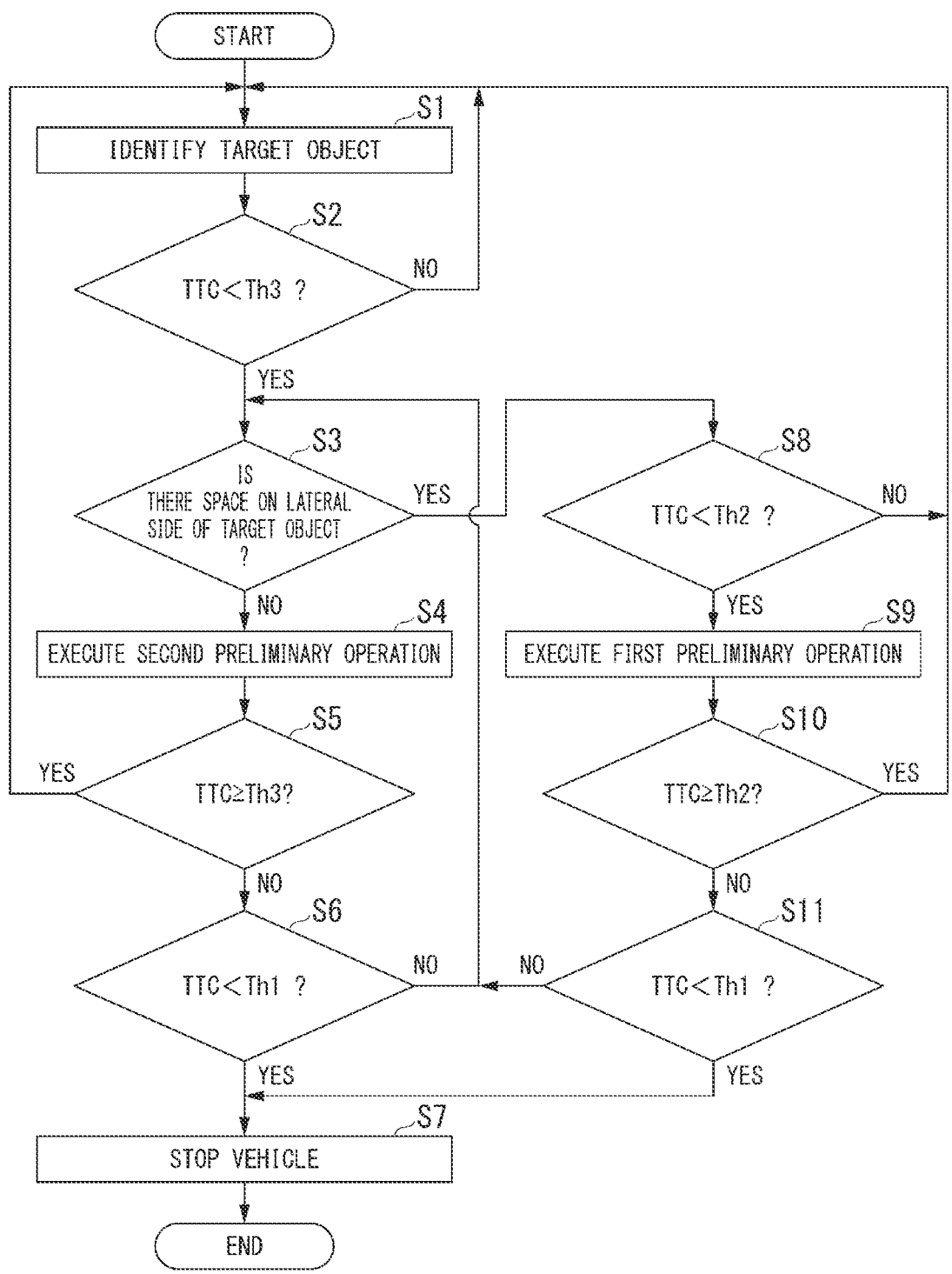
FIG. 5 is a flowchart showing an example of a flow of a process executed by the driving assistance device.

FIG. 5 is a flowchart showing an example of a flow of a process executed by the driving assistance device 100.

First, the braking controller 110 identifies a target object TO (step S1). Subsequently, the second preliminary operation controller 130 determines whether or not TTC between the vehicle M and the target object TO is less than the third threshold Th3 (step S2). When the TTC between the vehicle M and the target object TO is greater than or equal to the third threshold Th3, the process returns to step S1.

When it is determined that the TTC between the vehicle M and the target object TO is less than the third threshold Th3, the steering-based avoidance possibility determiner 132 of the second preliminary operation controller 130 determines whether or not there is a space where the vehicle M is able to travel in a travel path on a lateral side of the target object TO (step S3).

When it is determined that there is no space where the vehicle M is able to travel in the travel path on the lateral side of the target object TO, the second preliminary operation controller 130 executes the second preliminary operation (step S4). Subsequently, the second preliminary operation controller 130 determines whether or not the TTC between the vehicle M and the target object TO has increased to a value greater than or equal to the third threshold Th3 (step S5). When it is determined that the TTC between the vehicle M and the target object TO has increased to a value greater than or equal to the third threshold Th3, the process returns to step S1.

When it is determined that the TTC between the vehicle M and the target object TO has not increased to a value greater than or equal to the third threshold Th3, the braking controller 110 determines whether or not the TTC between the vehicle M and the target object TO is less than the first threshold Th1 (step S6). When it is determined that the TTC between the vehicle M and the target object TO is greater than or equal to the first threshold Th1, the process returns to step S3. When an affirmative determination has been obtained in step S3, the second preliminary operation is stopped and the processing from step S8 is executed. When it is determined that the TTC between the vehicle M and the target object TO is less than the first threshold Th1, the braking controller 110 causes the vehicle M to decelerate and stop by causing the brake device 210 and/or the travel driving force output device 200 to output a braking force for decelerating the vehicle M at the first deceleration B1 (step S7). At this time, as described above, in place of (or in addition to) decelerating and stopping the vehicle M, steering-based avoidance may be performed.

When an affirmative determination has been obtained in step S3, i.e., when the TTC between the vehicle M and the target object TO is less than the third threshold Th3, and there is a space where the vehicle M is able to travel in the travel path on the lateral side of the target object TO, the first preliminary operation controller 112 of the braking controller 110 determines whether or not the TTC between the vehicle M and the target object TO is less than the second threshold Th2 (step S8). When it is determined that the TTC between the vehicle M and the target object TO is greater than or equal to the second threshold Th2, the process returns to step S1.

When it is determined that the TTC between the vehicle M and the target object TO is less than the second threshold Th2, the first preliminary operation controller 112 executes the first preliminary operation (step S9). Subsequently, the first preliminary operation controller 112 determines whether or not the TTC between the vehicle M and the target object TO has increased to a value greater than or equal to the second threshold Th2 (step S10). When it is determined that the TTC between the vehicle M and the target object TO has increased to a value greater than or equal to the second threshold Th2, the process returns to step S1.

When it is determined that the TTC between the vehicle M and the target object TO has not increased to a value greater than or equal to the second threshold Th2, the braking controller 110 determines whether or not the TTC between the vehicle M and the target object TO is less than the first threshold Th1 (step S11). When it is determined that the TTC between the vehicle M and the target object TO is greater than or equal to the first threshold Th1, the process returns to step S3. When a negative determination has been obtained in step S3, the first preliminary operation is stopped and the processing from step S4 is executed. When it is determined that the TTC between the vehicle M and the target object TO is less than the first threshold Th1, the braking controller 110 causes the brake device 210 and/or the travel driving force output device 200 to output the first deceleration B1 and causes the vehicle M to decelerate and stop (step S7).

According to the above-described embodiment, when the degree of proximity between the target object TO and the vehicle M satisfies the third condition and it is determined, at a time point when the third condition is satisfied, that there is no space where the vehicle M is able to travel in both travel paths on lateral sides of the target object TO after the vehicle M avoids a collision with the target object TO in steering, it is possible to perform an appropriate preliminary operation corresponding to a surrounding situation of the target object TO by performing the second preliminary operation started at an earlier timing than the first preliminary operation.

In the above-described embodiment, in either of the first preliminary operation and the second preliminary operation, a display process, a sound output process, or a vibration output process or the like as an alert may be performed instead of the output of the braking force. In this case, as an example in which the second preliminary operation is performed in multiple steps, instead of outputting the braking force stepwise while changing the degree of deceleration as described above, a process of differentiating a degree of attention (contrast, brightness, color, or the like) between an initial display screen and second and subsequent display screens, a process of differentiating content or a volume between an initial sound output and second and subsequent sound outputs, a process of increasing second and subsequent vibration outputs as compared with the first vibration output, or the like may be provided.

In the above-described embodiment, when the branch road to the destination set in the navigation device 50 is located on the left or right side of the lane in which the vehicle M is traveling, the lane change may be forcedly made during the preliminary operation. Thus, consequently, it is possible to move the vehicle M in a direction closer to the destination and guide the vehicle M in a state in which the object serving as the target object is not near the vehicle M.

In the example described above, the interfering object is not taken into account. Hereinafter, interfering objects may be taken into account as described below. An interfering object is an object that interferes with an available travel space on the assumption that the vehicle M has approached the target object. The interfering object is, for example, an object estimated to be located in the above available travel space when the vehicle M has approached the above available travel space. The interfering object is, for example, a vehicle located behind the vehicle M and traveling at a speed that is higher than that of the vehicle M in a lane corresponding to the above-described available travel space. The interfering object is, for example, another vehicle that passes the vehicle M, travels in the above-described available travel space and interferes with the travel of the vehicle M in the above-described available travel space.

When it is determined that the above-described available travel space is present at or near a time point when the degree of proximity between the vehicle M and the target object satisfies the third condition (for example, a time point before or after the third condition is satisfied) and it is determined that there is an interfering object that interferes with the above-described available travel space in a case where the vehicle M has approached the target object, the second preliminary operation controller 130 executes the second preliminary operation or the first preliminary operation controller 112 executes the first preliminary operation.

For example, the first preliminary operation controller 112 performs the first preliminary operation at a time point when the second condition is satisfied when the degree of proximity between the vehicle M and the target object satisfies the second condition, it is determined that the above-described available travel space is present at or near a time point when the second condition is satisfied (for example, before the second condition is satisfied or at a time point when the third condition is satisfied), and it is determined that there is no interfering object. Hereinafter, these processes related to the interfering object will be specifically described.

[Process (1)]

Figure 6:
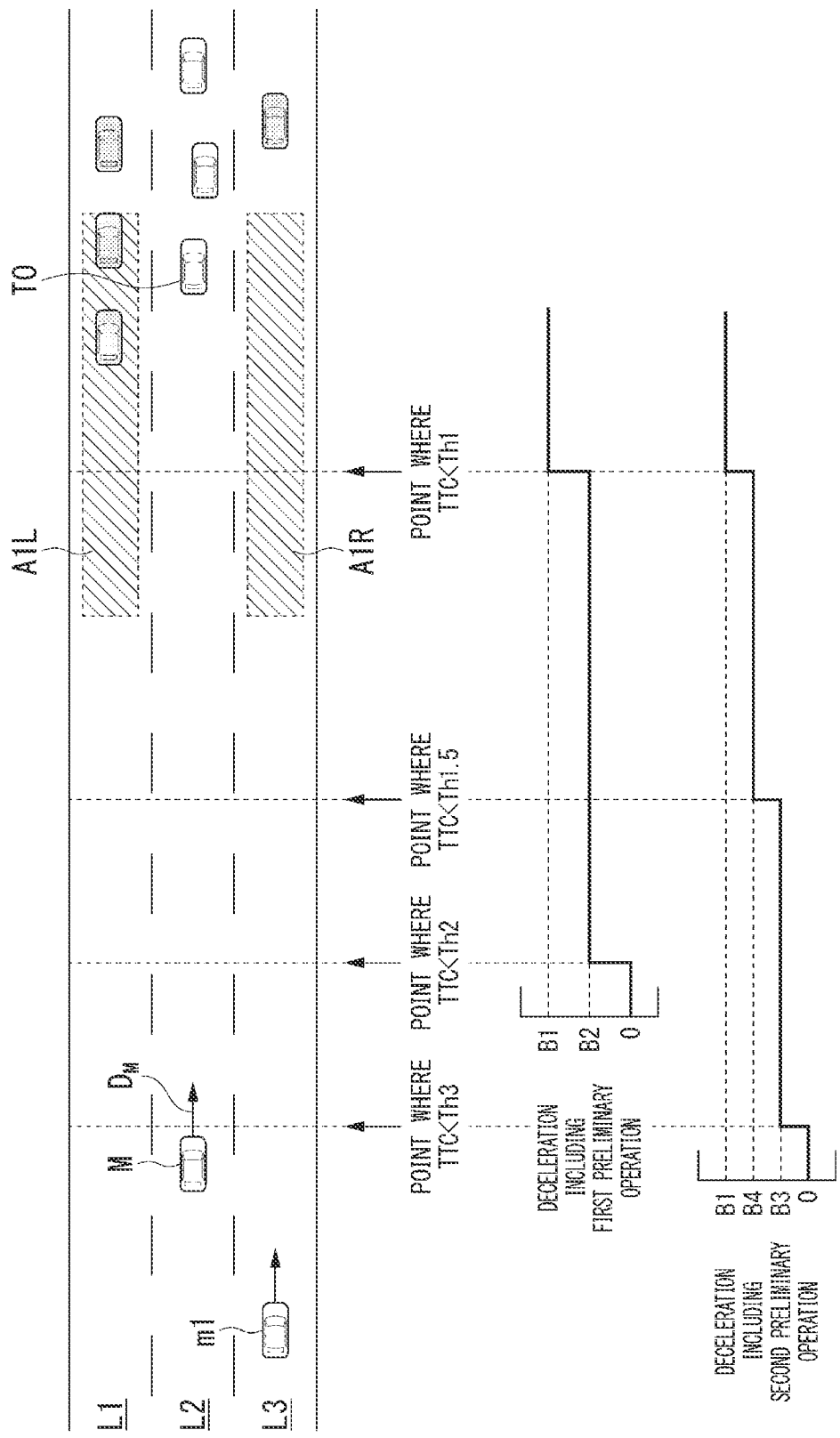
FIG. 6 is a diagram (1-1) for describing a change example of control content.

FIG. 6 is a diagram (1-1) for describing a process related to an interfering object. Differences from FIG. 4 will be described.

When the degree of proximity between the vehicle M and the target object satisfies the third condition, the above-described degree of proximity does not satisfy the second condition, it is determined that the above-described available travel space is present, and it is determined that there is an interfering object, the second preliminary operation controller 130 executes the second preliminary operation.

For example, the recognizer 102 recognizes that another vehicle ml is located in the lane L3 at (or near) the time point when the vehicle M satisfies the third condition. The estimator 104 estimates the future behavior of the other vehicle ml. For example, the estimator 104 estimates a position of the other vehicle ml when the vehicle M is located near an area A1L or A1R.

Figure 7:
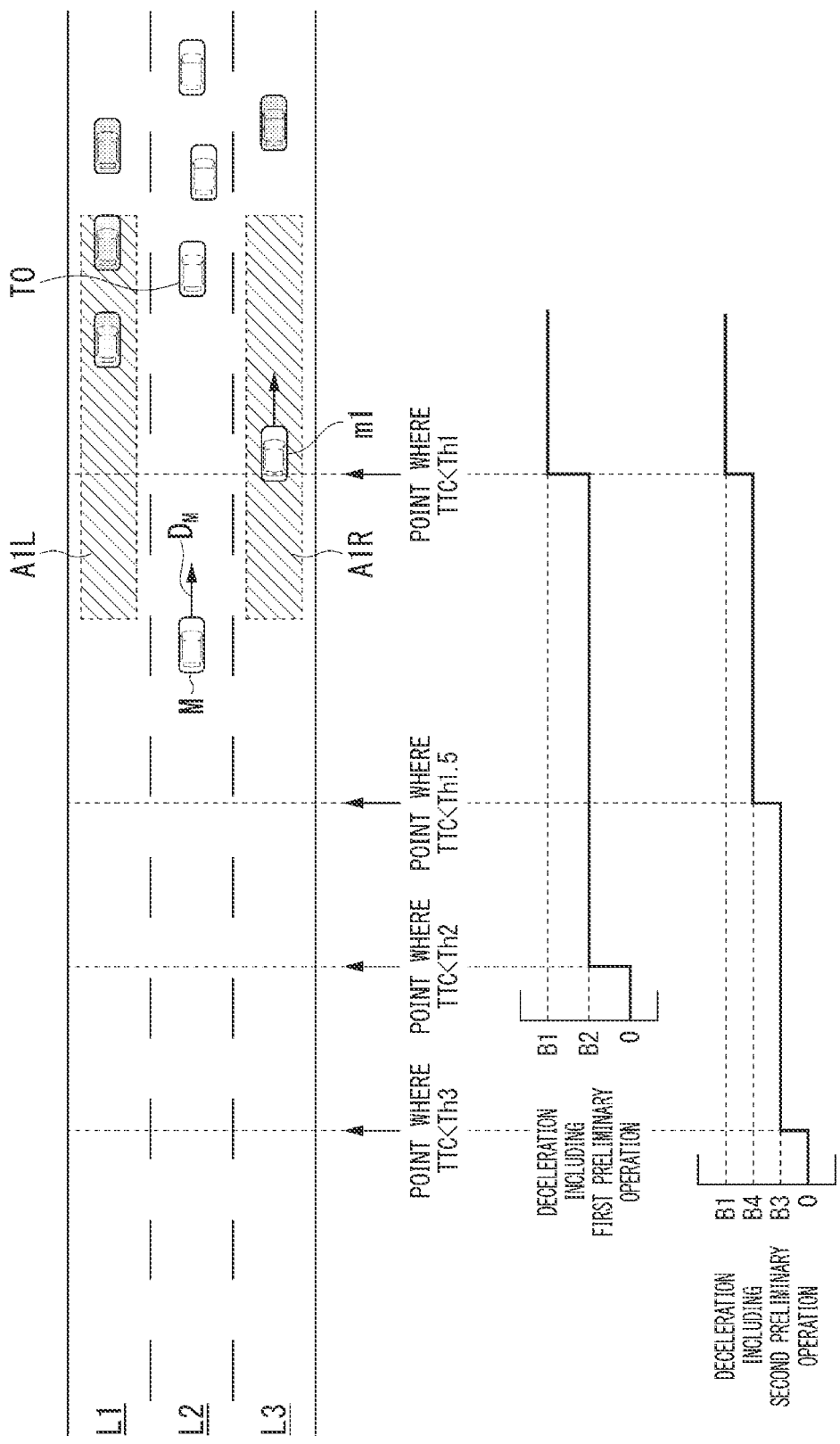
FIG. 7 is a diagram (1-2) for describing a change example of control content.

FIG. 7 is a diagram (1-2) for describing a process related to an interfering object. FIG. 7 is a diagram showing an example of an estimation result of the estimator 104. For example, when the vehicle M will be located near the area A1L or MR in the future, it is estimated that the other vehicle ml will be located in the area MR. That is, the estimator 104 estimates that the other vehicle ml is an interfering object.

In this case, in the situation of FIG. 6 described above, because there is no object in the area MR, the second preliminary operation is not originally performed, but the second preliminary operation controller 130 executes the second preliminary operation when it is determined that there is an interfering object.

For example, even if there is an available travel space according to steering, the second preliminary operation is executed in consideration of a possibility that another vehicle will enter this space in the future and the vehicle M will not be able to enter the space. Thereby, an appropriate operation corresponding to the surrounding situation of the target object can be performed.

[Flowchart]

Figure 8:
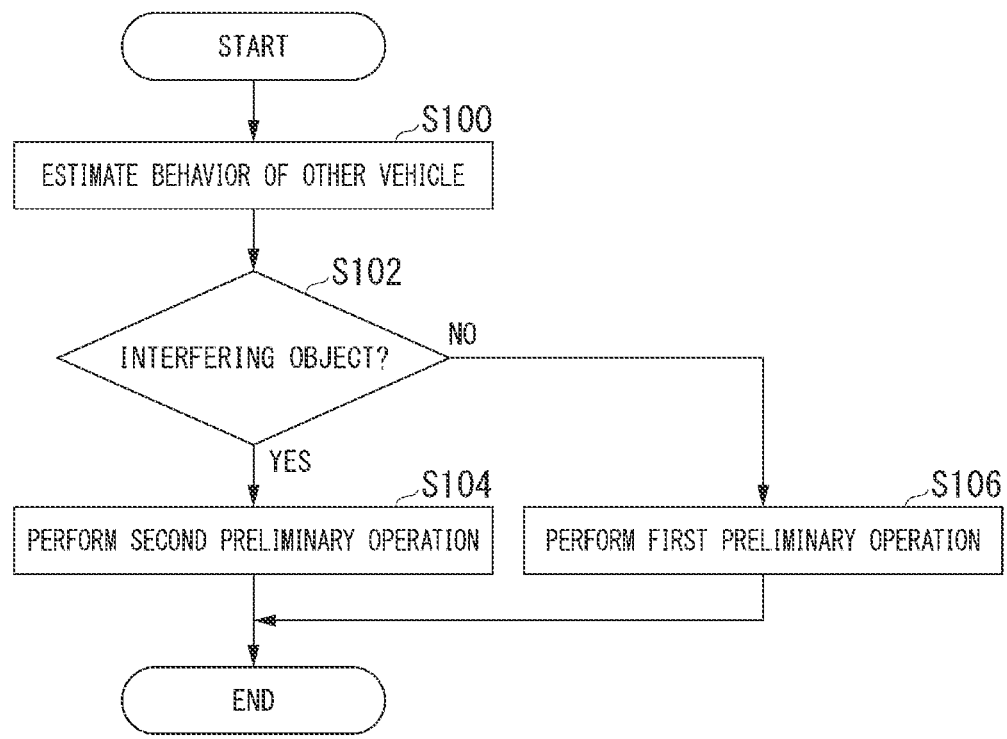
FIG. 8 is a flowchart showing another example of a flow of a process executed by the driving assistance device.

FIG. 8 is a flowchart showing another example of a flow of a process executed by the driving assistance device 100. The present process is a process that is executed when the third condition is satisfied and another vehicle is located. The other vehicle is, for example, a vehicle located behind the vehicle M in a lane adjacent to a lane in which the vehicle M is traveling and traveling at a speed higher than that of the vehicle M.

First, the estimator 104 estimates the behavior of the other vehicle (step S100). The driving assistance device 100 determines whether or not the other vehicle is an interfering object on the basis of an estimation result of the estimator 104 (step S102). When the other vehicle is an interfering object, the second preliminary operation controller 130 executes the second preliminary operation (step S104). When the other vehicle is not an interfering object, for example, the first preliminary operation controller 112 executes the first preliminary operation (step S106). For example, the first preliminary operation is executed at a time point when the second condition is satisfied. Thereby, the process of one routine of the present flowchart ends.

[Process (2)]

Figure 9:
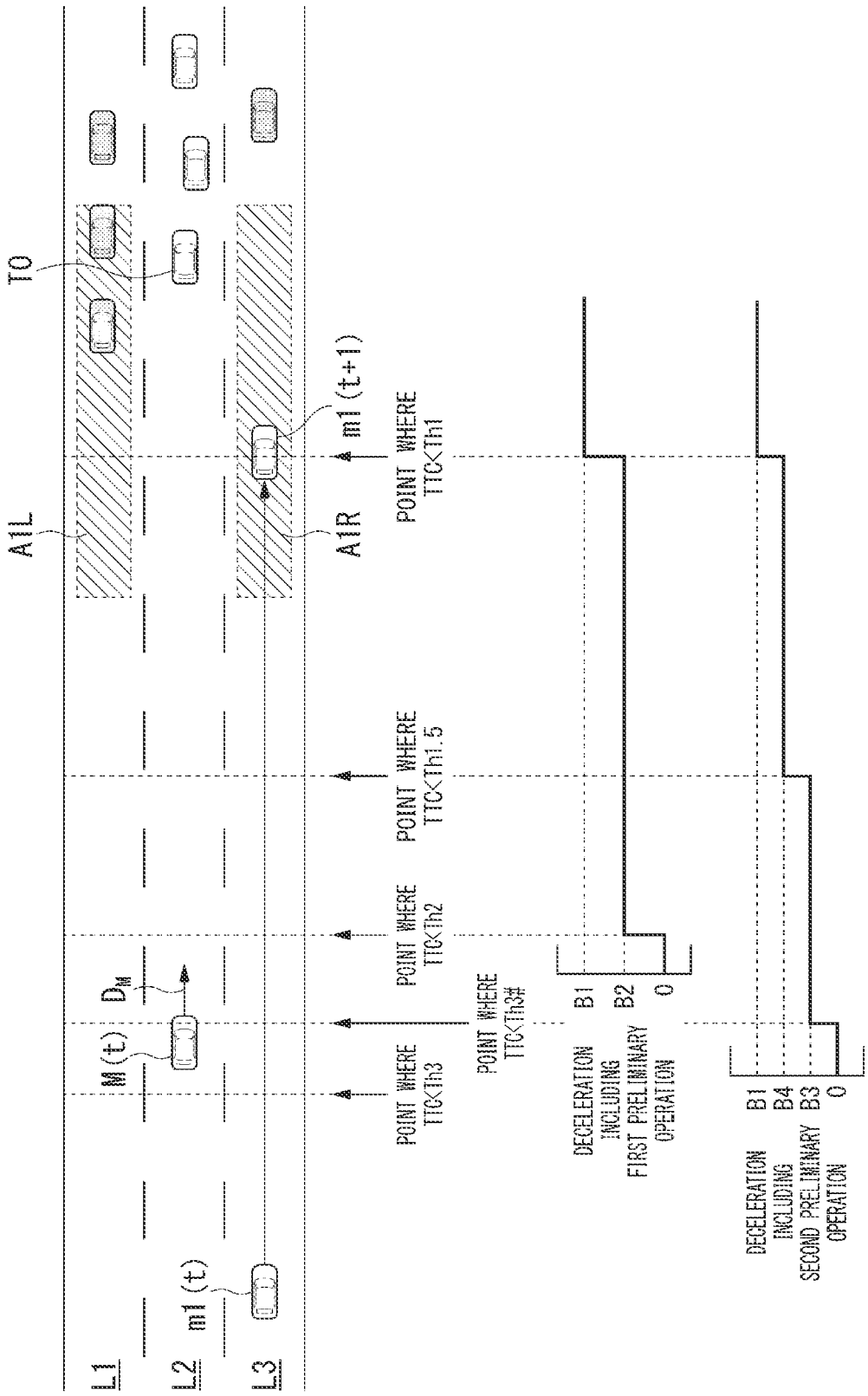
FIG. 9 is a diagram (2) for describing a change example of control content.

FIG. 9 is a diagram (2) for describing a process related to an interfering object. Differences from FIG. 4 and the like will be described.

When the degree of proximity between the vehicle M and the target object satisfies the third condition, the above-described degree of proximity does not satisfy the second condition, it is determined that the above-described available travel space is present, and it is determined that there is an interfering object, the second preliminary operation controller 130 executes the second preliminary operation.

A case where it is determined that there is no object in the area MR and there is no interfering object at a time point when the degree of proximity between the vehicle M and the target object satisfies the third condition is assumed. Subsequently, it is determined, before the second condition is satisfied (at a time point when the degree of proximity satisfies a threshold value Th3 #), that the above-described available travel space is present and it is estimated that there is an interfering object, the second preliminary operation controller 130 executes the second preliminary operation. That is, the second preliminary operation is performed at a timing before the first preliminary operation is performed. The threshold Th3 # is a threshold having a magnitude between the threshold Th3 and the threshold Th2.

In the example of FIG. 9, there is another vehicle m behind the vehicle M at the time t and the other vehicle m1 estimates that there is an object in the area MR at time t+1. Time t+1 is a time when it is estimated that the vehicle M is located near the area A1R. For example, the driving assistance device 100 may estimate the position of the vehicle M at time t+1 on the assumption that the vehicle M travels in the first preliminary operation or may estimate the position of the vehicle M at time t+1 on the assumption that the vehicle M travels on the basis of a prescribed standard different from that of the first preliminary operation.

As described above, when it is determined that there is an interfering object after the third condition is satisfied, the driving assistance device 100 can perform a preliminary operation at an early stage by performing the second preliminary operation. Thereby, an appropriate operation corresponding to the surrounding situation of the target object can be performed.

[Process (3)]

Figure 10:
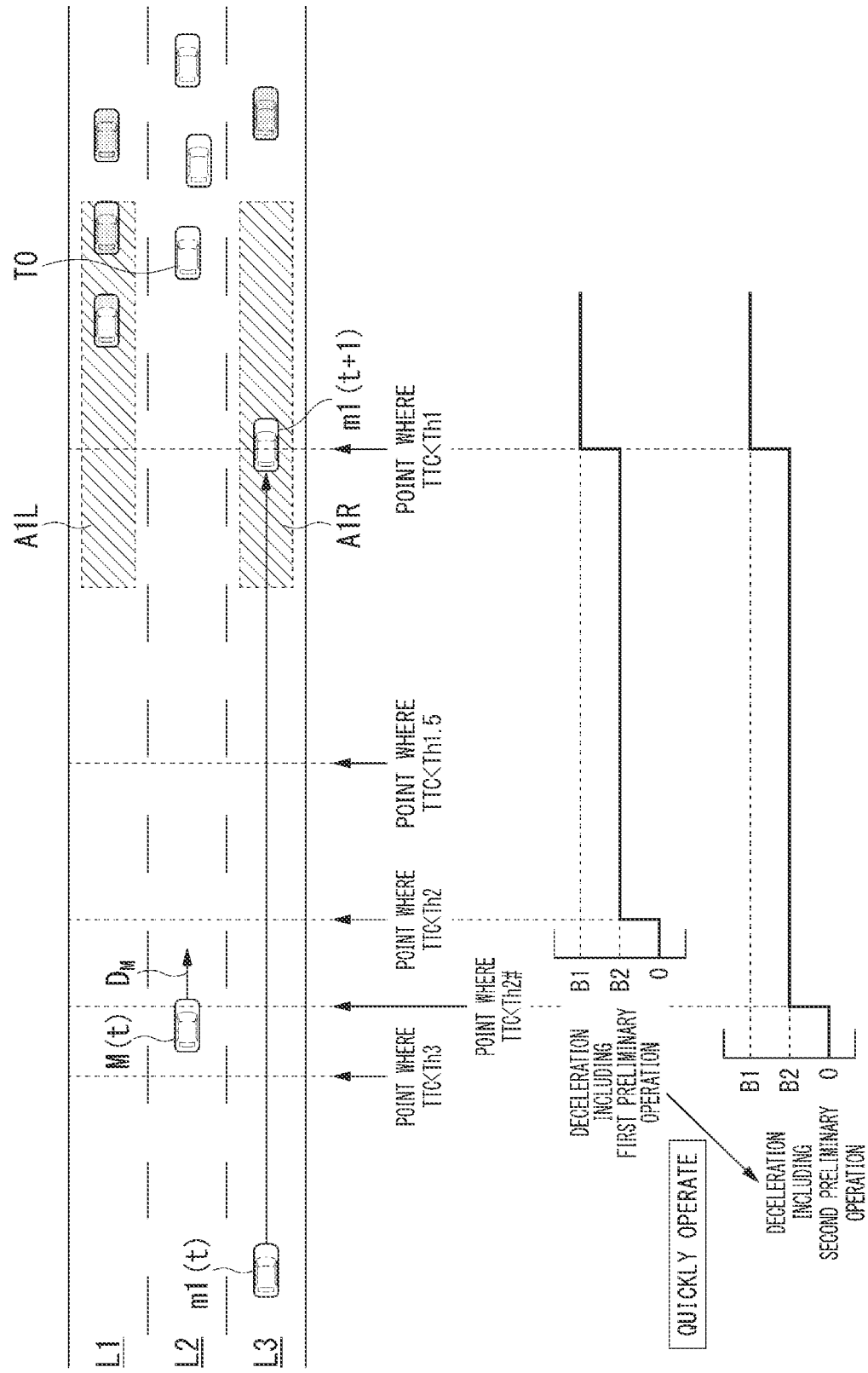
FIG. 10 is a diagram (3) for describing a change example of control content.

FIG. 10 is a diagram (3) for describing a process related to an interfering object. Differences from FIG. 9 and the like will be described.

When the degree of proximity between the vehicle M and the target object satisfies the third condition, the above-described degree of proximity does not satisfy the second condition, it is determined that the above-described available travel space is present, and it is estimated that there is an interfering object, the first preliminary operation controller 112 executes the first preliminary operation.

A case where it is determined that there is no object in the area MR and there is no interfering object at a time point when the degree of proximity between the vehicle M and the target object satisfies the third condition is assumed. Subsequently, before the second condition is satisfied (at a time point when the degree of proximity satisfies a threshold value Th2 #), the first preliminary operation controller 112 executes the first preliminary operation when it is determined that the above-described available travel space is present and there is an interfering object. That is, a timing at which the first preliminary operation is performed is advanced. The threshold Th2 # is a threshold having a magnitude between the threshold Th3 and the threshold Th2.

As described above, when it is determined that an interfering object is located after the third condition is satisfied, the driving assistance device 100 can perform a preliminary operation at an early stage by performing the first preliminary operation. Thereby, an appropriate operation corresponding to the surrounding situation of the target object can be performed.

[Process (4)]

Figure 11:
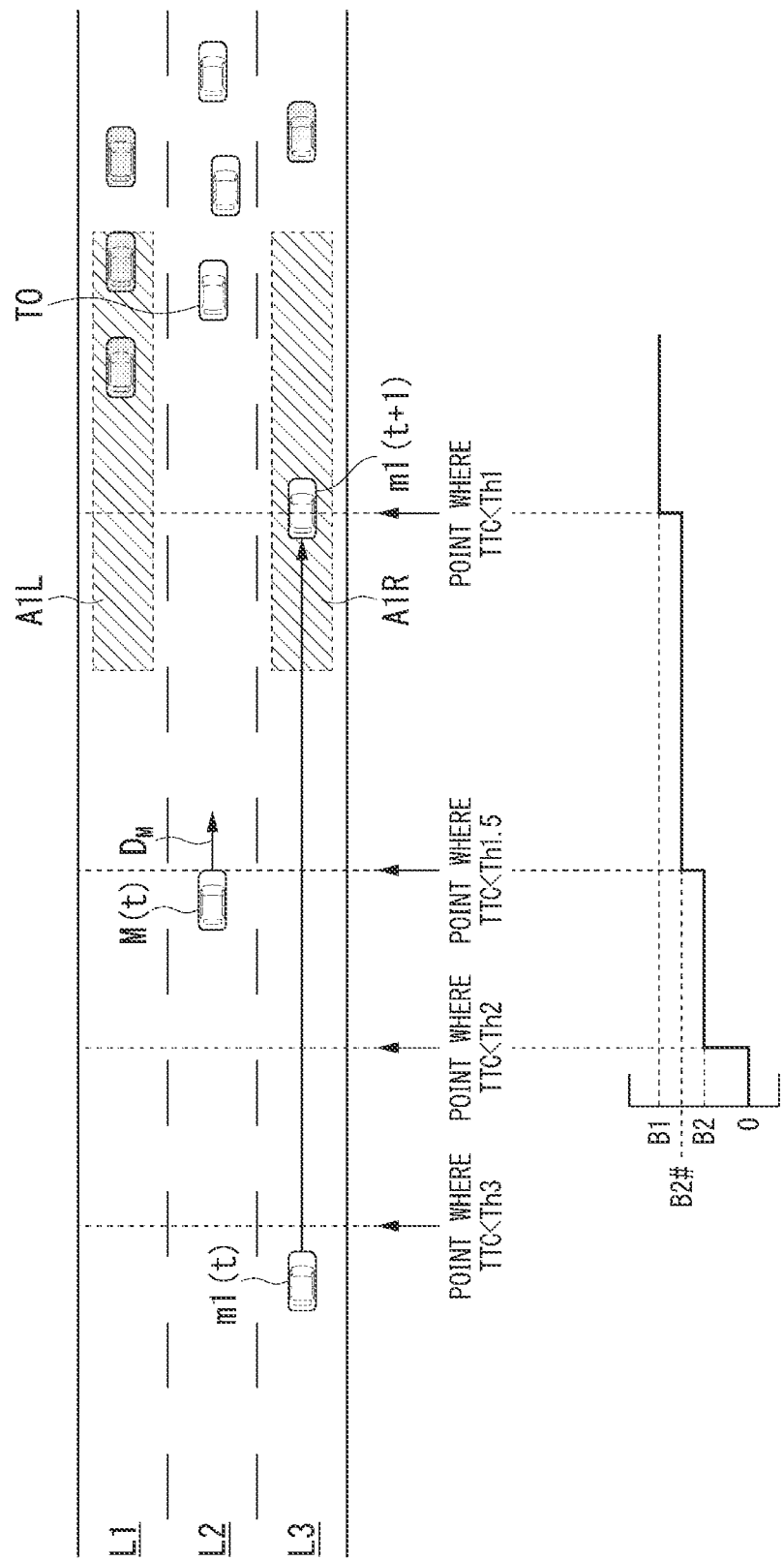
FIG. 11 is a diagram (4) for describing a change example of control content.

FIG. 11 is a diagram (4) for describing a process related to an interfering object. Differences from FIG. 4 and the like will be described.

For example, the first preliminary operation controller 112 performs the first preliminary operation when the degree of proximity between the vehicle M and the target object satisfies the second condition, it is determined that the above-described available travel space is present at or near a time point when the second condition is satisfied (before the second condition is satisfied or at a time point when the third condition is satisfied), and it is determined that there is no interfering object. When the degree of proximity between the vehicle M and the target object satisfies the second condition, it is determined, at a time point when the degree of proximity does not satisfy the first condition, that the above-described available travel space is present, and it is determined that the interfering object is not present, the first preliminary operation controller 112 makes the transition to the first preliminary operation having a higher operation level than the first preliminary operation that is performed when it is determined that the interfering object is not located.

A case where it is determined that there is no object in the area A1R and there is no interfering object at a time point when the degree of proximity between the vehicle M and the target object satisfies the second condition is assumed. Subsequently, before the first condition is satisfied (at a time point when the degree of proximity satisfies the threshold Th1.5), the first preliminary operation controller 112 changes content of the first preliminary operation when it is determined that the above-described available travel space is present and it is estimated that there is an interfering object. For example, the first preliminary operation controller 112 controls the vehicle M by increasing the deceleration from the deceleration B2 to deceleration B2#. Also, the first preliminary operation controller 112 may increase the degree of alarm. A threshold Th1.5# is a threshold having a magnitude between the threshold Th2 and the threshold Th1.

As described above, when it is determined that there is an interfering object after the second condition is satisfied, the driving assistance device 100 can perform an appropriate preliminary operation by changing the content of the first preliminary operation. Thereby, an appropriate operation corresponding to the surrounding situation of the target object can be performed.

All the above-described processes may be performed or some processes may be performed selectively. Also, in the above-described example, when the vehicle M has approached the target object, another vehicle located in the above-described available travel space is determined to be an interfering object. Alternatively (or additionally), the interfering object may be another vehicle located within a prescribed distance (several tens of meters, 100 meters, or several hundreds of meters) in front of and behind the vehicle M.

The embodiment described above can be represented as follows.

A driving assistance device including:
  a storage medium storing computer-readable instructions; and
  a processor connected to the storage medium, the processor executing the computer-readable instructions to:
  refer to an output of a detection device for detecting that an object is located in front of a vehicle and instruct a brake device of the vehicle to stop the vehicle when a degree of proximity between a target object among objects and the vehicle satisfies a first condition;
  instruct a steering device of the vehicle to avoid a collision with the target object in steering;
  perform a first preliminary operation when the degree of proximity between the target object and the vehicle satisfies a second condition and it is determined, at or near a time point when the second condition is satisfied, that there is an available travel space in one of travel paths on lateral sides of the target object after the vehicle avoids the collision with the object in the steering; and perform a second preliminary operation when the degree of proximity between the target object and the vehicle satisfies a third condition and it is determined, at or near a time point when the third condition is satisfied, that there is no available travel space in both travel paths on lateral sides of the target object after the vehicle avoids the collision with the object in the steering, wherein the first condition is a condition that is satisfied when the degree of proximity is higher than that of the second condition, wherein the second condition is a condition that is satisfied when the degree of proximity is higher than that of the third condition, and wherein, when it is determined, at or near a time point when the degree of proximity satisfies the third condition, that the available travel space is present and it is estimated that there is an interfering object that interferes with the available travel space on the assumption that the vehicle has approached the target object, a second preliminary operation controller performs the second preliminary operation or a first preliminary operation controller performs the first preliminary operation.

Although modes for carrying out the present invention have been described above using embodiments, the present invention is not limited to the embodiments and various modifications and substitutions can also be made without departing from the scope and spirit of the present invention.

What is claimed is:

1. A driving assistance device comprising:
a storage medium storing computer-readable instructions; and
at least one processor connected to the storage medium, the at least one processor executing the computer-readable instructions to:
execute referring process of referring to an output of a detection device for detecting that an object is located in front of a vehicle;
execute one or both of a braking control process of instructing a brake device of the vehicle to stop the vehicle when an indicator value that decreases as the vehicle approaches the object is less than a first threshold, and a steering-based avoidance control process of instructing a steering device of the vehicle to avoid a collision with the object in steering;
execute a first preliminary operation control process of performing a first preliminary operation of notifying a driver of the vehicle that the object is present when the indicator value is less than a second threshold and it is determined, at or near a time point when the indicator value is less than the second threshold, that there is a travel path along which the vehicle is able to travel on one of left and right sides of the object after the vehicle avoids the collision with the object in the steering; and
execute a second preliminary operation control process of performing a second preliminary operation of notifying the driver of the vehicle that the object is present when the indicator value is less than a third threshold and it is determined, at a time point when the indicator value is less than the third threshold, that there is no travel path along which the vehicle is able to travel on both left and right sides of the object after the vehicle avoids the collision with the object in the steering, wherein the first threshold is less than the second threshold and the second threshold is less than the third threshold, wherein the second preliminary operation or the first preliminary operation is executed when it is determined, at the time point when the indicator value is less than the third threshold, that there is a travel path along which the vehicle is able to travel and it is estimated that there is an interfering object that interferes with the travel path along which the vehicle is able to travel on the assumption that the vehicle has approached the object, the first preliminary operation includes some or all of outputting braking force, displaying, outputting sound, and outputting vibration, and the second preliminary operation includes some or all of outputting braking force, displaying, outputting sound, and outputting vibration.

2. The driving assistance device according to claim 1, wherein the at least one processor performs the first preliminary operation at the time point when the indicator value is less than the second threshold, it is determined, at the time point when the indicator value is less than the second threshold, that there is a travel path along which the vehicle is able to travel, and it is estimated that there is no interfering object.

3. The driving assistance device according to claim 1, wherein the interfering object is an object estimated to be located in an available travel space on the assumption that the vehicle has approached the available travel space.

4. The driving assistance device according to claim 1, wherein the interfering object is another vehicle located behind the vehicle and traveling at a higher speed than the vehicle in a lane corresponding to an available travel space.

5. The driving assistance device according to claim 1, wherein the at least one processor performs the second preliminary operation when the indicator value is less than the third threshold, the indicator value is not less than the second threshold, it is determined that there is a travel path along which the vehicle is able to travel, and it is estimated that the interfering object is present.

6. The driving assistance device according to claim 1, wherein the at least one processor performs the first preliminary operation when the indicator value is less than the third threshold, the indicator value is not less than the second threshold, it is determined that there is a travel path along which the vehicle is able to travel, and it is estimated that the interfering object is present.

7. The driving assistance device according to claim 1,
wherein the at least one processor performs the first preliminary operation when the indicator value is less than the second threshold, it is determined, at the time point when the indicator value is less than the second threshold, that there is a travel path along which the vehicle is able to travel, and it is estimated that the interfering object is not present, and
wherein, when the indicator value is less than the second threshold, it is determined, at a time point when the indicator value is not less than a first threshold, that there is a travel path along which the vehicle is able to travel, and it is estimated that the interfering object is present, the at least one processor makes a transition to the first preliminary operation having a higher operation level than the first preliminary operation that is performed when it is estimated that the interfering object is not present.

8. A driving assistance method comprising:
executing, by a driving assistance, referring process of referring to an output of a detection device for detecting that an object is located in front of a vehicle;
executing, by a driving assistance device, one or both of a braking control process of instructing a brake device of the vehicle to stop the vehicle when an indicator value that decreases as the vehicle approaches the object is less than a first threshold, and a steering-based avoidance control process of instructing a steering device of the vehicle to avoid a collision with the object in steering;
executing, by the driving assistance device, a first preliminary operation control process of performing a first preliminary operation of notifying a driver of the vehicle that the object is present when the indicator value is less than a second threshold and it is determined, at a time point when the indicator value is less than the second threshold, that there is a travel path along which the vehicle is able to travel on one of left and right sides of the object after the vehicle avoids the collision with the object in the steering; and
executing, by the driving assistance device, a second preliminary operation control process of performing a second preliminary operation of notifying the driver of the vehicle that the object is present when the indicator value is less than a third threshold and it is determined, at a time point when the indicator value is less than the third threshold, that there is no travel path along which the vehicle is able to travel on both left and right sides of the object after the vehicle avoids the collision with the object in the steering,
wherein the first threshold is less than the second threshold and the second threshold is less than the third threshold,
wherein the second preliminary operation or the first preliminary operation is executed when it is determined, at the time point when the indicator value is less than the third threshold, that there is a travel path along which the vehicle is able to travel and it is estimated that there is an interfering object that interferes with the travel path along which the vehicle is able to travel on the assumption that the vehicle has approached the object,
the first preliminary operation includes some or all of outputting braking force, displaying, outputting sound, and outputting vibration, and
the second preliminary operation includes some or all of outputting braking force, displaying, outputting sound, and outputting vibration.

9. A non-transitory computer storage medium storing a program for causing a computer to:
execute referring process of referring to an output of a detection device for detecting that an object is located in front of a vehicle;
execute one or both of a braking control process of instructing a brake device of the vehicle to stop the vehicle when an indicator value that decreases as the vehicle approaches the object is less than a first threshold, and a steering-based avoidance control process of instructing a steering device of the vehicle to avoid a collision with the object in steering;
execute a first preliminary operation control process of performing a first preliminary operation of notifying a driver of the vehicle that the object is present when the indicator value is less than a second threshold and it is determined, at a time point when the indicator value is less than the second threshold, that there is a travel path along which the vehicle is able to travel on one of left and right sides of the object after the vehicle avoids the collision with the object in the steering; and
execute a second preliminary operation control process of performing a second preliminary operation of notifying the driver of the vehicle that the object is present when the indicator value is less than a third threshold and it is determined, at a time point when the indicator value is less than the third threshold, that there is no travel path along which the vehicle is able to travel on both left and right sides of the object after the vehicle avoids the collision with the object in the steering,
wherein the first threshold is less than the second threshold and the second threshold is less than the third threshold,
wherein the second preliminary operation or the first preliminary operation is executed when it is determined, at the time point when the indicator value is less than the third threshold, that there is a travel path along which the vehicle is able to travel and it is estimated that there is an interfering object that interferes with the travel path along which the vehicle is able to travel on the assumption that the vehicle has approached the object,
the first preliminary operation includes some or all of outputting braking force, displaying, outputting sound, and outputting vibration, and
the second preliminary operation includes some or all of outputting braking force, displaying, outputting sound, and outputting vibration.

* * * * *